United States Patent Office

3,544,670
Patented Dec. 1, 1970

3,544,670
METHOD FOR PRODUCING POLYAMIDE FILAMENTARY ARTICLE
Taiichi Murao, Masakatsu Hara, Toru Sato, and Shigeo Katsuyama, Nobeoka-shi, and Toshio Sasaki, Ibaragi-shi, Japan, assignors to Asahi Kasei Kogyo Kabushiki Kaisha, Osaka, Japan, a Japanese corporation
Filed Sept. 5, 1968, Ser. No. 757,681
Claims priority, application Japan, Sept. 12, 1967, 42/58,093
Int. Cl. D01d 5/08
U.S. Cl. 264—178                              7 Claims

ABSTRACT OF THE DISCLOSURE

A polyamide filamentary article having high transparency and gloss is produced by solidifying a melt-extruded polyamide with a solution of an alkali such as KOH, NaOH and LiOH.

---

Figure 1:
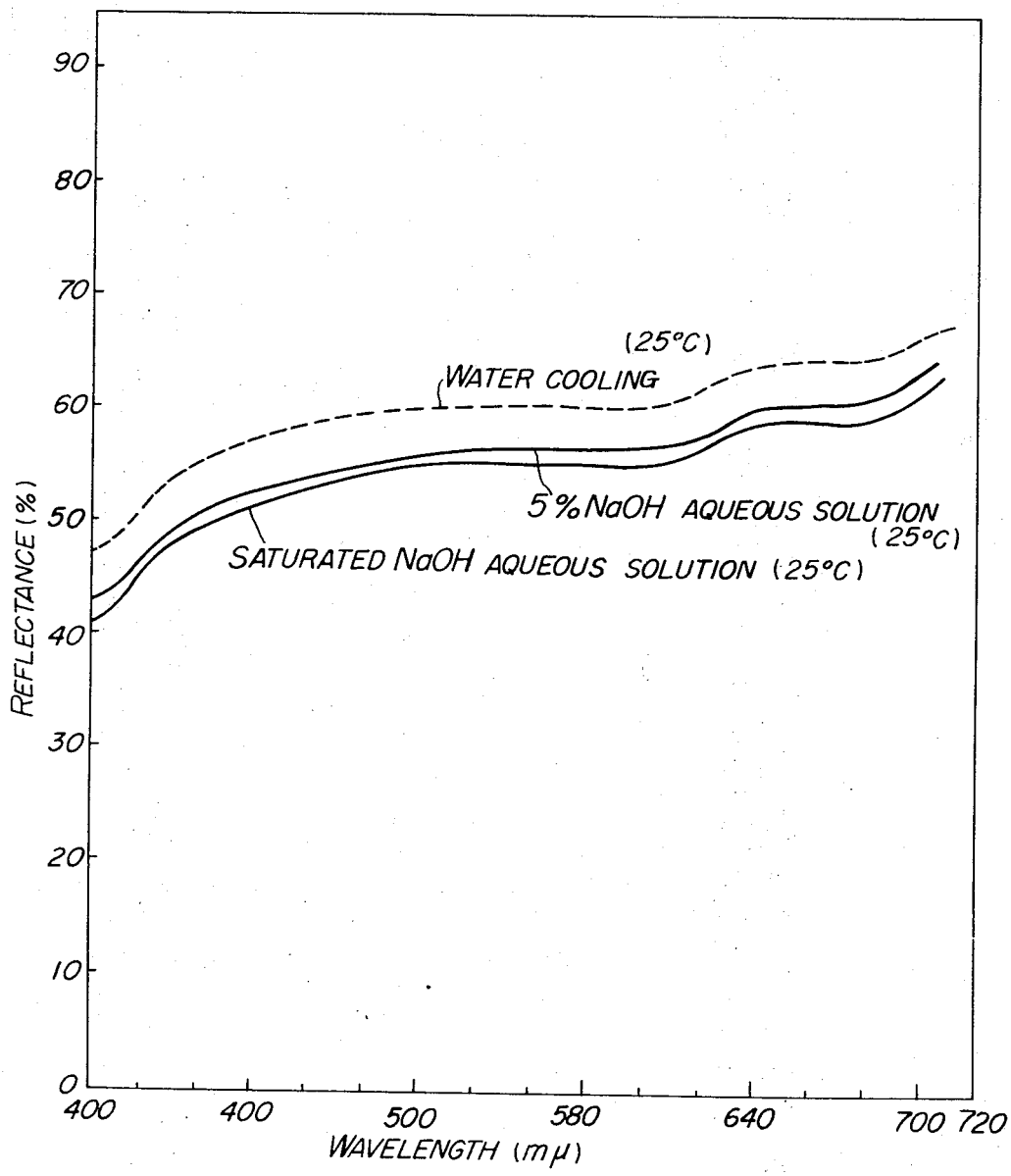

This invention is concerned with the preparation of polyamide filamentary articles such as nylon 6, nylon 66 and nylon 610 which has high gloss and transparency and which is suitable for fishing net, fishing line or sewing thread, wherein an alkali solution is used as a cooling bath in melt-spinning a polyamide such as nylon 6, nylon 66 and nylon 610 and cooling same.

Various methods have been proposed for producing transparent polyamide filamentary articles used for fishing net, fishing lines or sewing thread. For example, there has been proposed a method according to which a melt-spun polyamide filamentary article is solidified by rapidly cooling it using cold water or an aqueous solution of salts as a cooling medium. However, according to such a method, the transparency of the resultant product is not improved unless the temperature of the cold water or the aqueous solution of salts is lowered.

Further, it is known that a melt-spun polyamide filamentary article is cooled and solidified using methanol or trichloroethylene at a temperature of −5° to −60° C. as a cooling medium. However, according to this method, the opaqueness of the filament surface can be removed due to the use of the specific organic liquid which is used as a cooling medium, but the said organic liquid is less effective in removing the inside spherulite which causes opaqueness within the filaments than is water because of the low thermal conductivity and specific heat. Thus, such method is not very effective on monofilaments of large diameter. Further, a great heat loss is caused in order to maintain a low temperature of from −5° to −60° C. Moreover, since the organic liquid used is volatile at high temperatures, the loss of the liquid is great and the vapor of the liquid is harmful to the human body and thus pollutes the atmosphere during the operation. Therefore, complicated apparatus is required, thereby making the operation difficult. Thus, the method has economic disadvantages.

Another method is known which uses water or an aqueous solution of salts on which a non-polar liquid such as liquid paraffin is floated as a cooling medium for cooling and solidifying the melt-spun polyamide filaments. This method has economic disadvantages because the liquid paraffin floating on water or the aqueous solution of salts adheres to the surface of the filament, whereby the guide or drawing roller used in the operation is contaminated and a further step for removing the liquid paraffin adhering to the filaments is thus required. In addition, satisfactory transparency of the resultant product was not obtained.

A method in which a polyamide is mixed with a higher aliphatic acid such as stearic acid and behenic acid and is melt-spun is also known. However, in this method the additive cannot be homogeneously dissolved in the product and thus no homogeneous product is obtained. In a method which is an improvement upon the last mentioned method, ε-caprolactam to which a straight chain saturated aliphatic carboxylic acid having 16–22 of carbon atoms is added is polymerized, the thus obtained polymer is mixed with a polyamide, and the mixture is melt-spun. However, such a method is not effective for improving the transparency of filaments having a large diameter or films having a great thickness. In order to increase the effects of the carboxylic acid added, a large amount of said acid must be added. However, the addition of a large amount of said acid results in a conspicuous reduction in spinnability, as a result of which, the product is difficultly obtained.

Further, a method in which a polyamide to which barium stearate is added is spun is also known. However, the barium stearate added is also not effective unless it is added in a large amount. Thus, this method also has economic disadvantages.

There is also a known method according to which a melt-spun polyamide filamentary article is cooled and solidified with a phenol solution as a cooling medium to swell the surface of the filaments and prevent the deformation of filaments generated during the drawing step, to thereby improve the transparency of the filaments. Further, in a known method, a polyamide to which an alkanol amine and its derivatives are added is melt-spun to raise the crystallization speed of the polyamide to improve the transparency. However, these methods are not effective and their products are not satisfactory as goods which require a high degree of transparency.

The object of this invention is to provide a novel method which overcomes the defects in all the conventional methods mentioned above.

This invention will be explained in detail as follows.

The gist of this invention resides in the use of an aqueous solution of an alkali having a concentration of less than saturation as a cooling medium in cooling and solidifying a melt-spun polyamide such as nylon 6, nylon 66, and nylon 610. As the alkali solution, a base such as a hydroxide of an alkali, that is, KOH, NaOH, LiOH, etc. is preferably used, and so long as it is an alkali solution, the solution may additionally contain other salts.

The temperature of the solution is preferably lower than 50° C.

Further, the concentration of the alkali in the solution affects the transparency and the gloss degree of the product. The transparency and the gloss degree are reduced with a reduction of the concentration. Although the alkali limit of the concentration is not clear, a concentration of higher than 5% appears to be effective from the practical viewpoint.

When the polyamide filamentary article is cooled and solidified in an alkali solution and thereafter passed through a water-washing bath, the alkali which adheres to the surface of the filamentary article is dissolved in the water and is easily removed. The thusly treated filamentary article is thereafter subjected to the usual treatments and is then wound up.

According tod this invention, the alkali solution dissolving their salt also gives the same results.

Figure 2:
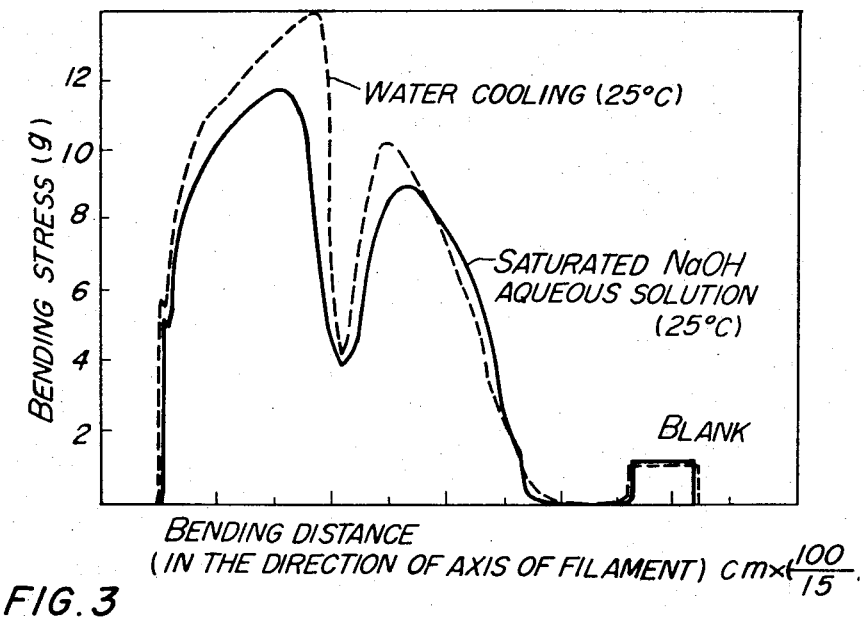
Figure 3:
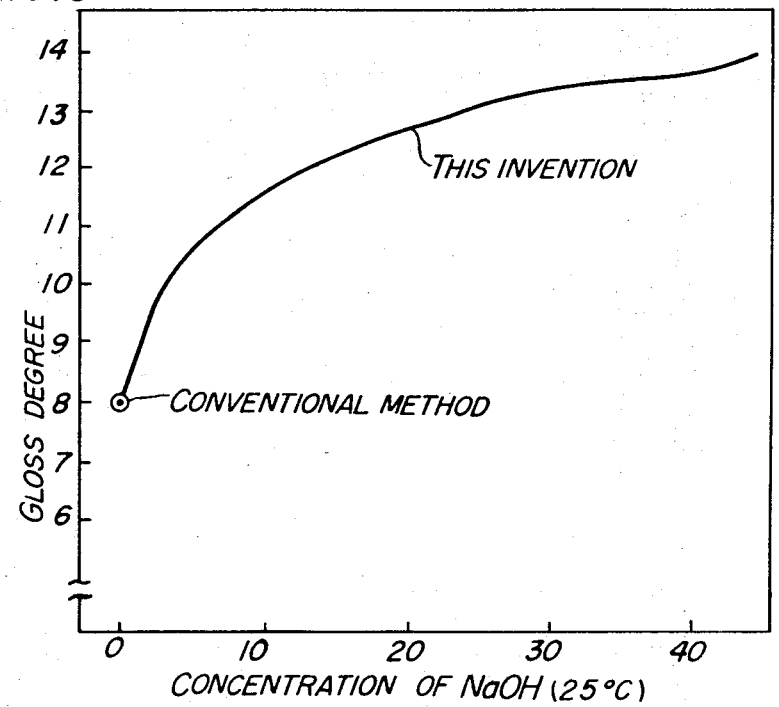

The obtained polyamide filamentary article has high surface gloss and transparency and is soft without deterioration of the physical and chemical properties regardless of the shape of cross section of the filamentary article. In the drawings which show the comparisons of the properties of the polyamide filamentary article obtained by this method and those of the product obtained by the conventional method, FIG. 1 shows the curves of reflectance, FIG. 2 shows curves of bending stress and FIG. 3 shows curves of gloss degree. Comparison of the reflectance curve in the area of visible light of the polyamide filamentary article of this invention with that of the conventional product obtained by solidifying with water shows that the product of this invention indicated by the solid line has a lower reflectance and better transparency than the conventional product indicated by a dotted line as is clear from FIG. 1. Regarding the bending stress in the direction of the axis of the filaments, FIG. 2 shows that the bending resistance curve of the product of this invention indicated by a solid line is much easier than

|  | Strength, g./d. | Elongation, percent | Denier | Whiteness | Gloss | Bending stress, g./d. | Transmittance, percent |
|---|---|---|---|---|---|---|---|
| Product obtained by water cooling (27° C.) | 5.11 | 26.8 | 1,069 | 58.9 | 8.9 | 0.21×10⁻² | 6.5 |
| Product of this invention | 5.24 | 29.7 | 1,078 | 53.7 | 14.1 | 0.16×10⁻² | 14.8 | that of the conventional product indicated by a dotted line. That is, the bending resistance of the former is lower than that of the latter. This fact means that the product of this invention displays a soft touch. Further, regarding the gloss of the product, as is shown in FIG. 3, the product of this invention has a remarkably high gloss degree.

As mentioned above, the polyamide filamentary article obtained by this invention has a conspicuously high transparency. The reason for such a result is not clear, but it seems that the molten and extruded polyamide filamentary article at a high temperature effects some reaction with the alkali metal to prevent the occurence of phenomena such as the formation of spherulite which damages the transparency of the filamentary article.

EXAMPLE 1

Nylon 6 heated at 270° C. was melt-extruded through orifices of 0.8 m./m. φ under an extrusion pressure of 30 atmospheric pressure and passed through a 47% aqueous NaCH solution at 25° C. to solidify the extruded product. Then, the resultant product was passed through a water-washing bath to remove adhered alkali and thereafter passed through hot water bath at 98° C., drawn to 4.2 times and then taken up. The resultant product was a soft monofilament having an excellent gloss degree and transparency and the other properties as shown in the following table.

EXAMPLE 2

Nylon 66 heated at 300° C. was melt-extruded through orifices of 0.6 m./m. φ under an extrusion pressure of 50 atmospheric pressure. The resultant product was passed through an aqueous KOH solution (30%) at 98° C., thereafter passed through a hot water bath at 98° C., drawn at 4.0 times and then taken up. The product was soft nylon 66 monofilament which was excellent in transparency and gloss and had the properties shown in the following table.

|  | Strength, g./d. | Elongation, percent | Denier | Whiteness | Gloss | Bending stress, g./d. | Transmittance, percent |
|---|---|---|---|---|---|---|---|
| Product obtained by water cooling (5° C.) | 5.41 | 30.2 | 812 | 61.3 | 8.2 | 0.18×10⁻² | 7.2 |
| Product of this invention | 5.30 | 25.3 | 798 | 55.8 | 12.8 | 0.12×10⁻² | 13.5 |

EXAMPLE 3

Nylon 610 heated at 300° C. was melt-extruded through orifices of 0.8 m./m.φ under an extrusion pressure of 60 atmospheric pressure. The resultant product was passed through a 30% aqueous NaOH solution at 10° C. to solidify it. Then the solidified product was passed through a water-washing bath to remove the alkali adhering to the product. The product was then passed through a hot water bath at 98° C., drawn to 3.6 times and wound up. Thus obtained product was a soft monofilament having high transparency and gloss as shown in the following table.

|  | Strength, g./d. | Elongation, percent | Denier | Whiteness | Gloss | Bending stress, g./d. | Transmittance, percent |
|---|---|---|---|---|---|---|---|
| Product obtained by water cooling (10° C.) | 4.41 | 26.1 | 920 | 78.0 | 11.6 | 0.11×10⁻² | 6.2 |
| Product of this invention | 4.30 | 25.3 | 935 | 71.6 | 13.2 | 0.07×10⁻² | 10.6 |

EXAMPLE 4

Nylon 6 heated at 280° C. was melt-extruded through regularly triangular orifices having a side of 0.54 m./m.φ under an extrusion pressure of 40 atmospheric pressure. The resultant extruded product was passed through a cooling bath (10° C.) which was a saturated aqueous Na₂SO₄ solution in which 5% of NaOH was dissolved. The thusly obtained solidified product was passed through a water-washing bath to remove the alkali adhering to the product, then cold-drawn to 3.8 times in air and wound up. The product was soft nylon monofilament excellent in transparency and gloss as shown in the following table.

|  | Strength, g./d. | Elongation, percent | Denier | Whiteness | Gloss | Bending stress, g./d. | Transmittance, percent |
|---|---|---|---|---|---|---|---|
| Product obtained by water cooling (2° C.) | 4.03 | 43.0 | 53.0 | 77.7 | 11.59 | 0.29×10⁻³ | 8 |
| Product of this invention | 4.12 | 45.8 | 50.5 | 72.3 | 14.50 | 0.12×10⁻³ | 11 |

EXAMPLE 5

Nylon 6 heated at 280° C. was melt-extruded through slit orifices of 0.1 x 15 m./m. under an extrusion pressure of 40 atmospheric pressure. The extruded product was passed through a 47% aqueous NaOH solution at 50° C. Thus solidified product was passed through a water-washing bath to remove the alkali adhering to the product, cold-drawn to 3.8 times in air and wound up. The product was soft nylon monofilament excellent in transparency and gloss as shown in the following table.

|  | Strength, g./d. | Elongation, percent | Denier | Whiteness | Gloss | Bending stress, g./d. | Transmittance, percent |
|---|---|---|---|---|---|---|---|
| Product obtained by water cooling (50° C.) | 4.03 | 38.5 | 350 | 50.3 | 9.3 | $0.25 \times 10^{-4}$ | 6.1 |
| Product of this invention | 3.95 | 40.5 | 375 | 45.3 | 11.5 | $0.11 \times 10^{-4}$ | 8.2 |

The values referred to in the above examples were measured as follows:

Strength·Elongation: These were obtained from tension S—S curve.
Whiteness·gloss: JIS L–1013.
Bending stress: By a measuring apparatus of bending stress.
Reflectance: By a spectrophotometer.

What is claimed is:
1. A method for producing a highly transparent and glossy polyamide filamentary article, which comprises cooling and solidifying a melt-spun polyamide using an alkali solution having a concentration of from 5% to less than saturation as a cooling medium.
2. A method according to claim 1, wherein said alkali is selected from the group consisting of KOH, NaOH and LiOH.
3. A method according to claim 1, wherein the polyamide is a member selected from the group consisting of nylon 6, nylon 66, and nylon 610.
4. A method according to claim 1, wherein the alkali solution additionally contains salts.
5. A method according to claim 1, wherein the temperature of the alkali solution is lower than 50° C.
6. A method according to claim 4, wherein the alkali solution contains $Na_2SO_4$.
7. A method according to claim 6, wherein the alkali solution is saturated with respect to $Na_2SO_4$ and has a concentration of 5% with respect to the alkali

References Cited
UNITED STATES PATENTS

| | | | |
|---|---|---|---|
| 2,324,397 | 7/1943 | Hall | 264—176UX |
| 3,002,804 | 10/1961 | Kilian | 264—181X |
| 3,027,602 | 4/1962 | Hamilton et al. | 264—178 |
| 3,318,989 | 5/1967 | Sato et al. | 264—176 |

JULIUS FROME, Primary Examiner

J. H. WOO, Assistant Examiner

U.S. Cl. X.R.
284—237